United States Patent
Lin et al.

(10) Patent No.: US 12,227,983 B2
(45) Date of Patent: Feb. 18, 2025

(54) AUTOMATIC VEHICLE-DOOR ACTIVATING SENSING SYSTEM AND METHOD THEREFOR

(71) Applicant: ROYALTEK COMPANY LTD., Taoyuan (TW)

(72) Inventors: Kuo Wei Lin, Taoyuan (TW); Chun Yen Chen, Taoyuan (TW)

(73) Assignee: RoyalTek Company Ltd., Taoyuan (TW)

( * ) Notice: Subject to any disclaimer, the term of this patent is extended or adjusted under 35 U.S.C. 154(b) by 334 days.

(21) Appl. No.: 18/049,008

(22) Filed: Oct. 24, 2022

(65) Prior Publication Data
US 2023/0279718 A1 Sep. 7, 2023

(30) Foreign Application Priority Data
Mar. 4, 2022 (TW) .................................. 111108028

(51) Int. Cl.
*E05F 15/73* (2015.01)
*B60J 5/10* (2006.01)

(52) U.S. Cl.
CPC ............... *E05F 15/73* (2015.01); *B60J 5/101* (2013.01); *E05F 2015/765* (2015.01); *E05Y 2400/322* (2013.01)

(58) Field of Classification Search
CPC ..... E05F 15/73; E05F 2015/765; B60J 5/101; E05Y 2400/322; E05Y 2400/852; E05Y 2400/858; E05Y 2900/546
See application file for complete search history.

(56) References Cited

U.S. PATENT DOCUMENTS

2019/0249480 A1* 8/2019 Tokudome .......... B60R 25/2054

FOREIGN PATENT DOCUMENTS

| JP | 2012029163 A | | 2/2012 |
|---|---|---|---|
| JP | 2014214472 A | * | 11/2014 |

(Continued)

OTHER PUBLICATIONS

Machine Translation of JP-2014214472-A, corresponds to Japanese Application No. JP 2013091720 A (Year: 2014).*

(Continued)

*Primary Examiner* — Alan D Hutchinson
(74) *Attorney, Agent, or Firm* — Rosenberg, Klein & Lee

(57) ABSTRACT

An automatic vehicle-door activating sensing system and a method therefor are provided. The system includes: a distance sensing antenna module and an activating antenna module for generating signals; a processor generates a first distance information, a second distance information, and a activating information according to the signals. When the first distance information is less than a distance threshold and a waveform of the activating information changes, the processor generates and transmits a ready-to-activate signal to an in-vehicle system. When the second distance information is greater than the distance threshold, the processor generates and transmits a vehicle door activating signal to the in-vehicle system. The in-vehicle system can activate the vehicle door after receiving the signals in sequence. With one radar, the invention can automatically activate the vehicle door based on a user's position and kicking behavior, thereby preventing misoperation caused by detection.

16 Claims, 4 Drawing Sheets

(56) References Cited

FOREIGN PATENT DOCUMENTS

| | | |
|---|---|---|
| JP | 2015021238 A | 2/2015 |
| JP | 2016188537 A | 11/2016 |
| JP | 2019196096 A | 11/2019 |

OTHER PUBLICATIONS

Foreign Office Action in Counterpart Foreign Application No. 2022-102455.

* cited by examiner

AUTOMATIC VEHICLE-DOOR ACTIVATING SENSING SYSTEM AND METHOD THEREFOR

This application claims priority of application Ser. No. 11/108,028 filed in Taiwan on 4 Mar. 2022 under 35 U.S.C. § 119; the entire contents of all of which are hereby incorporated by reference.

FIELD OF THE INVENTION

The invention relates to a technology of controlling a vehicle door, in particular, to an automatic vehicle-door activating sensing system and a method therefor.

DESCRIPTION OF THE PRIOR ART

To meet the needs of vehicle users, more and more vehicle dealers choose to install automatic vehicle-door opening systems on their vehicles to automatically open the vehicle doors and improve the convenience of users.

At present, the common automatic vehicle-door opening technology is that an automatic detector is installed at the bottom of the vehicle door, and the vehicle door can be controlled to open when the automatic detector detects that a user shakes the foot.

Generally, most automatic detectors use an ultrasonic radar to detect foot shaking. However, the ultrasonic detection is not stable, and misoperations are ten detected, which leads to the automatic opening of the vehicle door, thereby causing problems in the safety of the technology of opening the vehicle door automatically.

Therefore, to ensure safety and avoid unnecessary misoperations, in addition to originally opening the vehicle door when the automatic detector detects the foot shaking, the vehicle dealers have added many restrictions. However, if there are too many restrictions, the vehicle door cannot be accurately triggered to open, which increases the trouble for the user.

In view of this, for the above-mentioned deficiencies in the prior art, the invention provides an automatic vehicle-door activating sensing system and a method therefor, to effectively overcome the above-mentioned problems.

SUMMARY OF THE INVENTION

The main objective of the invention is to provide an automatic vehicle-door activating sensing system and a method therefor. By using only one radar, activating behaviors of a position and a kicking of a user may be detected, and the system may control the automatic vehicle-door activating according to two parameters of activating behaviors of the position and the kicking of the user, thereby reducing the chance of the system detecting misoperations.

Another objective of the invention is to provide an automatic vehicle-door activating sensing system and a method therefor, which uses a millimeter wave radar for detection. Two activating parameters of the user's position and kicking behaviors may be accurately detected, thereby solving the shortcomings of using ultrasonic detection in the past that misoperates easily.

In order to achieve the above objectives, the invention provides an automatic vehicle-door activating sensing system, which is connected with an in-vehicle system to control the activating of a vehicle door. The automatic vehicle-door activating sensing system includes a substrate, a distance sensing antenna module, an activating sensing antenna module, and a processor that are connected to the substrate. The distance sensing antenna module generates a first signal and a second signal. The activating sensing antenna module generates a third signal. The processor is disposed on the substrate and connected with the distance sensing antenna module, the activating sensing antenna module, and the in-vehicle system. The processor receives the first signal and the second signal to generate a first distance information and a second distance information according to the first signal and the second signal; also, the processor receives the third signal to generate a activating information. When the processor determines that the first distance information is less than a distance threshold and a waveform of the activating information changes, the processor generates and transmits a ready-to-activate signal to an in-vehicle system. When the processor determines that the second distance information is greater than the distance threshold, the processor generates and transmits a vehicle door activating signal to the in-vehicle system. The in-vehicle system can activate the vehicle door after receiving the ready-to-activate signal and the vehicle door activating signal.

In the embodiment, an included angle of signal emission directions of the distance sensing antenna module and the activating sensing antenna module is at least 90 degrees.

In the embodiment, the signal emission direction of the distance sensing antenna module is a horizontal direction, and the signal emission direction of the activating sensing antenna module is a vertical direction.

In the embodiment, the distance sensing antenna module includes at least two first receiving antennas and at least one first transmitting antenna.

In the embodiment, the activating sensing antenna module includes at least two second receiving antennas and at least one second transmitting antenna.

In the embodiment, the automatic vehicle-door activating sensing system further includes a triangular base, wherein the substrate is disposed on a top portion of the triangular base, and the distance sensing antenna module and the activating sensing antenna module are disposed on adjacent two sides of the triangular base respectively. The system further includes a housing, which covers the triangular base, the substrate, the processor, the distance sensing antenna module, and the activating sensing antenna module.

In the embodiment, the distance sensing antenna module and the activating sensing antenna module are frequency modulated continuous waveform radar (FMCW) antenna modules.

In addition, the invention also provides an automatic vehicle-door activating sensing method, which includes steps of: receiving, by a processor, a first signal and a third signal to generate a first distance information and a second distance information according to the first signal, and a activating information according to the third signal; determining, by the processor, whether the first distance information is less than a distance threshold and a waveform of the activating information changes or not: if not, returning to the step of receiving the first distance information and the activating information; if so, generating a ready-to-activate signal, by the processor, to transmit to an in-vehicle system, and proceeding to the next step, and receiving, by the processor, a second signal to generate a second distance information according to the second signal; then, determining, by the processor, whether the second distance information is greater than the distance threshold or not: if not, returning to the step of receiving, by the processor, the second distance information; if so, generating and transmitting a vehicle door activating signal to the in-vehicle system, and proceeding to the next step; activating, by the in-vehicle system, the vehicle door after receiving the ready-to-activate signal and the vehicle door activating signal.

In the embodiment, the step of activating, by the in-vehicle system, the vehicle door after receiving the ready-to-activate signal and the vehicle door activating signal further includes: activating, by the in-vehicle system, the vehicle door if the vehicle door activating signal is received less than a preset time after receiving the vehicle door activating signal.

The following describes in detail with specific embodiments, such that a person ordinarily skilled in the art can understand the purpose, technical content, characteristics, and effects of the invention.

DESCRIPTION OF THE PREFERRED EMBODIMENTS

Figure 1:
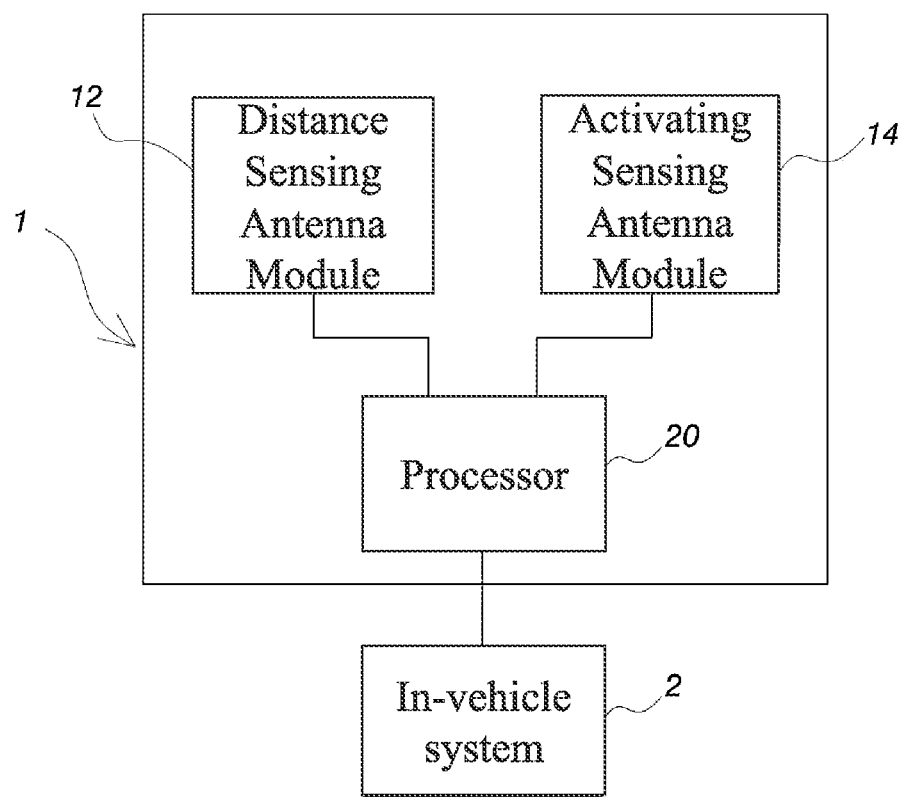
FIG. 1 is a block diagram of a system in the present invention.

The invention provides an automatic vehicle-door activating sensing system, which may be installed on the vehicle, and connected with an in-vehicle system in the vehicle. The automatic vehicle-door activating sensing system may transmit information to the in-vehicle system, and inform the in-vehicle system to control the activating of the vehicle door according to the information.

Next, it is explained how to achieve the above effects through the system architecture and method of the invention. First, with reference to FIGS. 1 and 2, a structure of an automatic vehicle-door activating sensing system 1 of the invention is described. The automatic vehicle-door activating sensing system 1 includes a substrate 10, a distance sensing antenna module 12, an activating sensing antenna module 14, and a processor 20. The distance sensing antenna module 12, the activating sensing antenna module 14, and the processor 20 are connected on the substrate 10. The processor 20 is disposed on the substrate. The substrate is a circuit board. The distance sensing antenna module 12, and the activating sensing antenna module 14 are frequency modulated continuous waveform (FMCW) radar antenna modules, which may emit frequency modulated continuous waves. The distance sensing antenna module 12, and the activating sensing antenna module 14 may sense external objects to generate a first signal, a second signal, and a third signal, respectively.

The processor 20 is a system on chip (SOC) connected to the distance sensing antenna module 12, the activating sensing antenna module 14, and the in-vehicle system 2. The processor 20 receives the first signal and the second signal transmitted by the distance sensing antenna module 12; then, the processor 20 generate a first distance information and a second distance information according to the first signal and the second signal, respectively. The processor 20 receives the third signal transmitted by the activating sensing antenna module 14, and the processor 20 generates an activating information according to the third signal, so that the processor 20 may determine whether to inform the in-vehicle system 2 to activate the door according to the information.

The first signal, the second signal, and the third signal are FMCW, and the processor 20 may determine the distance of the object according to the FMCW technology.

Figure 2:
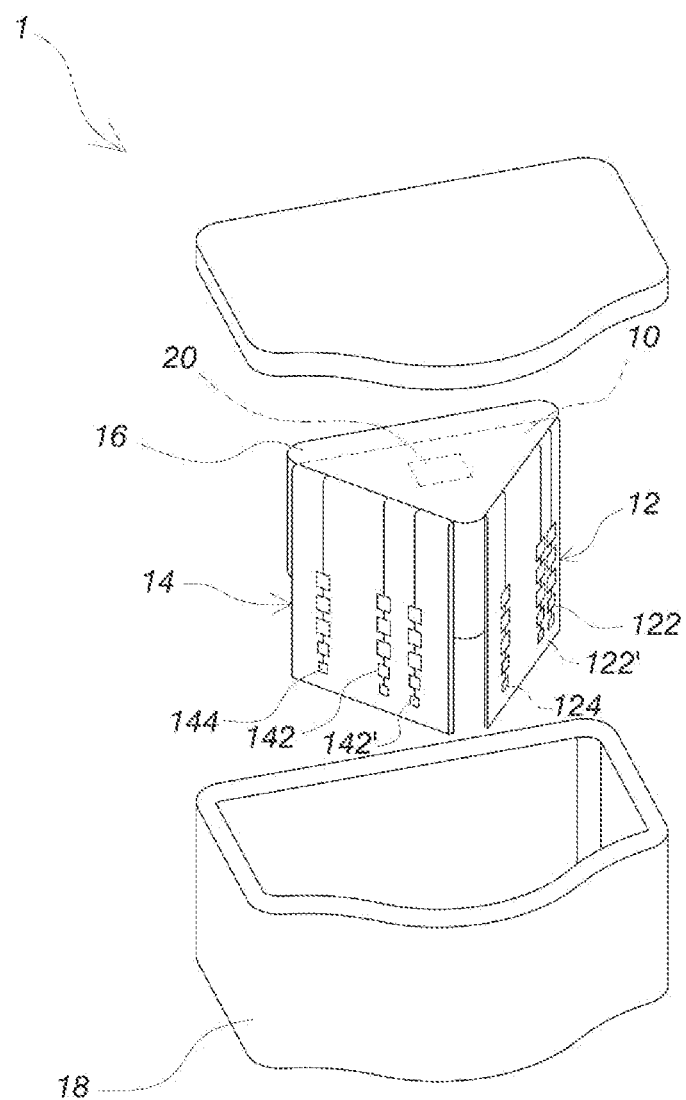
FIG. 2 is an exploded diagram of components of a radar device in the present invention.

With reference to FIGS. 2, in addition to the above structure, the automatic vehicle-door activating sensing system further includes a triangular base 16 and a housing 18. The triangular base 16 provides that the substrate 10 is disposed on a top portion of the triangular base 16, and the distance sensing antenna module 12 and the activating sensing antenna module 14 are disposed on adjacent two sides of the triangular base 16, respectively. In the embodiment, an included angle between the adjacent two sides of the distance sensing antenna module 12 and the activating sensing antenna module 14 is greater than 90 degrees, preferably 100 degrees, so that an included angle of signal emission directions of the distance sensing antenna module 12 and the activating sensing antenna module 14 is at least 90 degrees, and the signals of the distance sensing antenna module 12 and the activating sensing antenna module 14 may be respectively emitted in different directions. The housing 18 is used to cover the substrate 10, the processor 20, the triangular base 16, the distance sensing antenna module 12, and the activating sensing antenna module 14. The housing 18 may be used for waterproof or dustproof functions.

With continuous reference to FIG. 2, detailed structures of the distance sensing antenna module 12 and the activating sensing antenna module 14 are described. In the embodiment, the structure of the distance sensing antenna module 12 includes at least two first receiving antennas 122, 122' and at least one first transmitting antenna 124. Since the first receiving antennas 122, 122' and the at least one first transmitting antenna 124 of the distance sensing antenna module 12 may be of flexible antenna circuit board structures, the distance sensing antenna module 12 is connected to the substrate 10, fixed by the triangular base 16 and then bent while being attached to the sides of the triangular base 16 by bending the top portion of the triangular base 16.

The structure of the activating sensing antenna module 14 includes at least two second receiving antennas 142, 142' and at least one second transmitting antenna 144. Since the at least two second receiving antennas 142, 142' and the at least one second transmitting antenna 144 of the activating sensing antenna module 14 may be of flexible antenna circuit board structures, the activating sensing antenna module 14 is connected to the substrate 10, fixed by the triangular base 16 and then bent while being attached to the sides of the triangular base 16 by bending the top portion of the triangular base 16.

The antennas of the distance sensing antenna module 12 and the activating sensing antenna module 14 are designed by assembly antenna. The antennas may be an array type of single antenna or formed by different types of array antennas that match with each other to meet practical application requirements. For example, the antennas can be the followings: (1) a patch antenna; (2) a slot antenna; (3) a combination of the patch antenna only, the slot antenna only, and the monopole antenna; or (4) a combination of the patch antenna only, the slot antenna only, and a dipole antenna.

In the embodiment, the antennas of the distance sensing antenna module 12 and the activating sensing antenna module 14 are designed by using a millimeter wave radar (mmWave radar) with 79 GHz, wherein a 4 GHz bandwidth allows the resolution to reach 4.3 cm, which may accurately detect a position and a kicking behavior of a User, thereby solving the shortcomings of ultrasonic detection in the past. In addition to good range resolution, the resolution speed of millimeter wave radar may reach 0.5 m/s. This Doppler-Effect based technology can perform the calculation on the difference between FMCW radar's transmission and reception, and the characteristic is used to reduce misoperations as well.

Figure 3:
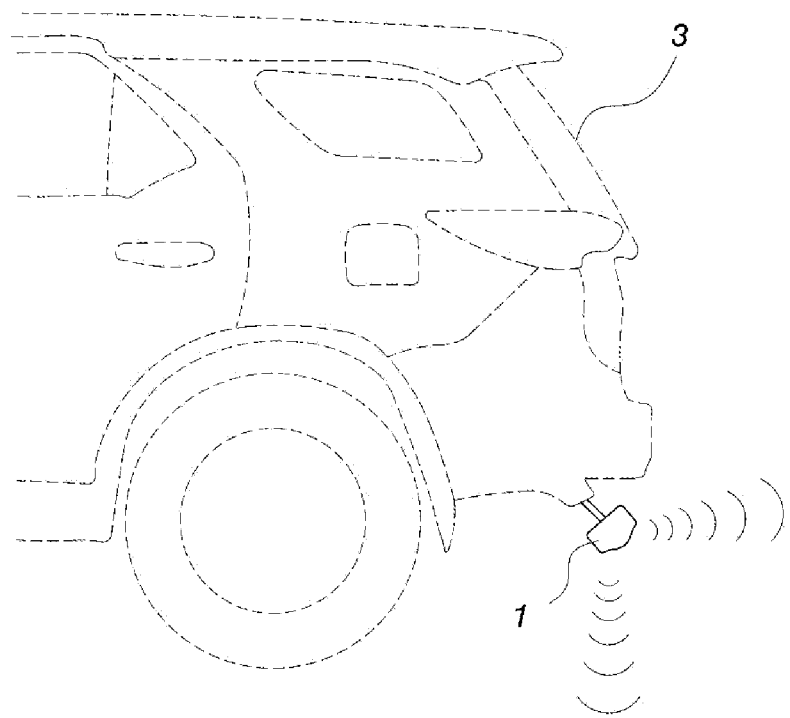
FIG. 3 is a diagram of a using state in the present invention.
Figure 4:
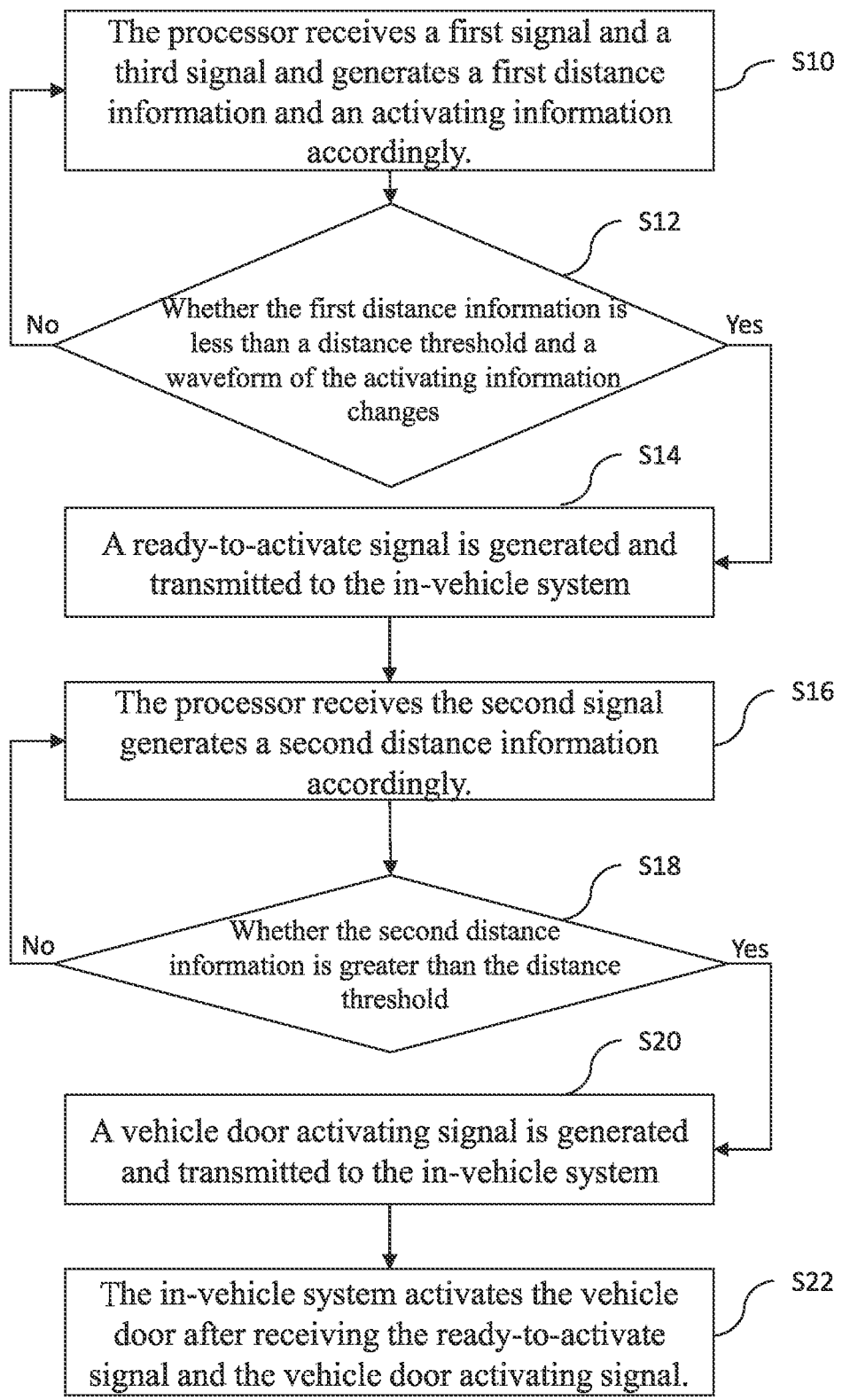
FIG. 4 is a flow chart of a method in the present invention.

After the structure of the automatic vehicle-door activating sensing system 1 of the invention, a using state and a flow of method of the invention are described. With reference to FIGS. 1 to 3, in the embodiment, the automatic vehicle-door activating sensing system 1 is installed below a rear vehicle door 3 to sense the operations of the user for activating the rear vehicle door 3. Specifically, since the distance sensing antenna module 12 and the activating sensing antenna module 14 in the automatic vehicle-door activating sensing system 1 are disposed on two adjacent sides of the triangular base 16, respectively, there is a difference of more than 90 degrees between the signal emission directions of the distance sensing antenna module 12 and the activating sensing antenna module 14. In the embodiment, the signal emission direction of the activating sensing antenna module 14 is adjusted to be a direction perpendicular to the ground to sense the user shaking the foot to generate the activating information. The signal emission direction of the distance sensing antenna module 12 is adjusted to a horizontal direction towards the rear part of the vehicle, and a direction parallel to the ground. In addition to sensing the distance of the user, the distance sensing antenna module 12 also uses the Doppler Effect to detect whether the user is approaching or moving away.

With reference to FIGS. 1 to 4, a flow of an automatic vehicle-door activating sensing method of the invention is described. In step S10, the processor 20 receives a first signal transmitted by the distance sensing antenna module 12 and a third signal transmitted by the activating sensing antenna module 14; then, the processor 20 generates a first distance information according to the first signal, and generates an activating information according to the third signal. The first signal and the third signal are FMCWs, and the processor 20 may determine the distance of the object according to the FMCW technology.

When the user is approaching the rear vehicle door 3, the distance sensing antenna module 12 may first detect that the user is approaching based on Doppler Effect, and correspondingly generate and transmit a first signal to the processor 20 for generating the first distance information. To activate the rear vehicle door 3, the user may put his/her foot under the rear vehicle door 3 and shake the foot. At the same time, the activating sensing antenna module 14 senses the shaking foot, and generates and transmits the third signal to the processor 20 for generating the activating information. The foot shaking behavior may change the waveform emitted by the activating sensing antenna module 14, so the waveform of the activating information changes.

Next, the flow proceeds to step S12. The processor 20 determines whether the first distance information is less than a distance threshold and a waveform of the activating information changes: if not, the flow turns back to the step S10; if so, the flow proceeds to step S14, the processor 20 generates and transmits a ready-to-activate signal to the in-vehicle system 2, and the flow proceeds to step S16. Specifically, when the first distance information is less than the distance threshold, it means that the user is approaching the rear vehicle door 3, and the situation is confirmed. When the user shakes the foot to change the waveform of the activating information, it is determined that the user has indeed acted to activate the vehicle door. The waveform of changes in the activating information is defined as the followings. At first, the distance between the obstacle/the user/the foot thereof and the activating sensing antenna module 14 is from far to near; it can be determined with the relative speed based on the Doppler Effect. Then, the distance between the obstacle/the user/the foot thereof and the activating sensing antenna module 14 is from near to far; it can be determined with the relative speed based on the Doppler Effect. The above-mentioned waveform changing is regarded as the activating information of a complete kicking behavior, so that the misoperations caused by other behaviors may be prevented. Then, the processor 20 generates and transmits the ready-to-activate signal to the in-vehicle system 2 for preparing to activate the rear vehicle door 3. In the embodiment, the distance threshold may be 40 cm.

Then, the flow proceeds to step S16. The processor 20 receives the second signal, transmitted by the distance sensing antenna module 12, and generates a second distance information accordingly. The second signal is the frequency modulated continuous wave, and the processor 20 may determine the distance of the object according to the technology of the frequency change.

The flow proceeds to step S18. The processor 20 determines whether the second distance information is greater than the distance threshold: if not, returning to the step S16; if so, proceeding to step S20. In step S20, a vehicle door activating signal is generated and transmitted to the in-vehicle system 2. In step S22, the operating mechanism is as followings: at first, the user needs to approach the activating sensing antenna module 14 installed on the rear vehicle door 3, so that the processor 20 may generate a vehicle door activating signal according to the signal of the user shaking foot; then, since the rear vehicle door 3 may hit the user if it is opened directly, so it is necessary to wait until the user to step back a distance. In other words, the activating signal should be transmitted to the in-vehicle system 2 only when the processor 20 determines that the second distance information is greater than the distance threshold.

Finally, the flow proceeds to step S22. The in-vehicle system 2 activates the vehicle door after receiving the ready-to-activate signal and the vehicle door activating signal. In the embodiment, the in-vehicle system 2 receives the vehicle door activating signal when less than a preset time (such as 3 seconds) after receiving the ready-to-activate signal to open the rear vehicle door 3. If the vehicle door activating signal is not received in 3 seconds after receiving the ready-to-activate signal, the vehicle door will not be opened, which is used as a foolproof mechanism to avoid the situation that the rear vehicle door 3 may be activated under abnormal conditions since the user has not retreated to a distance or there is an obstacle within a distance. However, the process and detection method of closing the rear vehicle door 3 are the same as the automatic opening of the rear vehicle door 3, so the description is not repeated.

The automatic vehicle-door activating sensing system 1 of the invention has the following advantages: the distance sensing antenna module 12 for detecting the user's position (Back sensor) is separated from the antenna module of the activating sensing antenna module 14 for kicking behavior (Kick sensor), and the information of being close to or being away from is added to achieve a low misjudgment rate in addition to the accuracy of distance detection, so that if there is an animal under the rear vehicle door 3, no matter whether it is stationary or moving, the distance sensing antenna module 12 will not detect the object, and the processor 20 will not generate a vehicle door activating signal to the in-vehicle system 2 to request to open the rear vehicle door 3, thereby effectively reducing the misjudgment of opening the rear vehicle door 3 and reducing possible risk factors.

In summary, the invention may simultaneously detect the position and the kicking behavior of the user by using only one radar, so that automatic vehicle-door activating may be controlled based on two parameters of the position and the kicking behavior of the user, thereby reducing the chance of detecting misoperations. In the invention, a millimeter wave radar is used to accurately detect the user's position and kicking behaviors, solving the shortcomings of using ultrasonic detection in the past that misoperates easily.

The above-mentioned description is only the preferred embodiments of the present invention and is not intended to limit the scope of the implementation of the present invention. Therefore, any equivalent changes or modifications made according to the features and spirit described within the scope of the present invention should be included within the claims of the present invention.

What is claimed is:

1. An automatic vehicle-door activating sensing system, connected with an in-vehicle system to control the activating of a vehicle door, comprising:
    a substrate;
    a distance sensing antenna module, connected on the substrate to generate a first signal and a second signal;
    a activating sensing antenna module, connected on the substrate to generate a third signal; and
    a processor, disposed on the substrate and connected with the distance sensing antenna module, the activating sensing antenna module, and the in-vehicle system, thereby receiving the first signal and the second signal to generate a first distance information and a second distance information according to the first signal and the second signal, and receiving the third signal to generate an activating information; wherein,
    when the first distance information is less than a distance threshold and a waveform of the activating information changes, the processor generates a ready-to-activate signal and transmits the ready-to-activate signal to the in-vehicle system;
    when the processor determines that the second distance information is greater than the distance threshold, the processor generates a vehicle door activating signal and transmits the vehicle door activating signal to the in-vehicle system, so that the in-vehicle system opens the vehicle door after receiving the ready-to-activate signal and the vehicle door activating signal.

2. The automatic vehicle-door activating sensing system according to claim 1, wherein an included angle of signal emission directions of the distance sensing antenna module and the activating sensing antenna module is at least 90 degrees.

3. The automatic vehicle-door activating sensing system according to claim 2, wherein the signal emission direction of the distance sensing antenna module is a horizontal direction, and the signal emission direction of the activating sensing antenna module is a vertical direction.

4. The automatic vehicle-door activating sensing system according to claim 1, wherein the distance sensing antenna module is configured to generate the second signal after the ready-to-activate signal is generated.

5. The automatic vehicle-door activating sensing system according to claim 1, wherein the distance sensing antenna module senses a user based on the Doppler effect to generate the first signal and the second signal, and wherein the first signal represents that the user approaches the distance sensing antenna module, and the second signal represents that the user moves away from the distance sensing antenna module.

6. The automatic vehicle-door activating sensing system according to claim 1, wherein the distance sensing antenna module comprises at least two first receiving antennas and at least one first transmitting antenna.

7. The automatic vehicle-door activating sensing system according to claim 6, wherein the at least two first receiving antennas and the at least one first transmitting antenna are flexible antenna circuit board structures.

8. The automatic vehicle-door activating sensing system according to claim 1, wherein the activating sensing antenna module comprises at least two second receiving antennas and at least one second transmitting antenna.

9. The automatic vehicle-door activating sensing system according to claim 8, wherein the at least two second receiving antennas and the at least one second transmitting antenna are flexible antenna circuit board structures.

10. The automatic vehicle-door activating sensing system according to claim 1, wherein the substrate is a circuit board.

11. The automatic vehicle-door activating sensing system according to claim 1, further comprising:
    a triangular base, wherein the substrate is disposed on a top portion of the triangular base, and the distance sensing antenna module and the activating sensing antenna module are disposed on adjacent two sides of the triangular base, respectively; and
    a housing, covering the triangular base, the substrate, the processor, the distance sensing antenna module, and the activating sensing antenna module.

12. The automatic vehicle-door activating sensing system according to claim 1, wherein the distance sensing antenna module and the activating sensing antenna module are frequency modulated continuous waveform radar antenna modules.

13. An automatic vehicle-door activating sensing method, comprising steps of:
    receiving, by a processor, a first signal and a third signal to generate a first distance information and a activating information according to the first signal and the third signal, respectively;
    determining, by the processor, whether the first distance information is less than a distance threshold and whether a waveform of the activating information changes: if not, returning to the step of receiving the first signal and the third signal; and if so, generating and transmitting a ready-to-activate signal, by the processor, to an in-vehicle system and proceeding to the next step;
    receiving, by the processor, a second signal to generate a second distance information according to the second signal;
    determining, by the processor, whether the second distance information is greater than the distance threshold: if not, returning to the step of receiving the second signal; and if so, generating and transmitting a vehicle door activating signal, by the processor, to the in-vehicle system, and proceeding to the next step; and
    activating, by the in-vehicle system, the vehicle door after receiving the ready-to-activate signal and the vehicle door activating signal.

14. The automatic vehicle-door activating sensing method according to claim 13, wherein the step of activating, by the in-vehicle system, the vehicle door after receiving the ready-to-activate signal and the vehicle door activating signal further comprises:

activating, by the in-vehicle system, the vehicle door if the vehicle door activating signal is received less than a preset time after receiving the vehicle door activating signal.

15. The automatic vehicle-door activating sensing method according to claim 13, wherein the third signal is generated by an activating sensing antenna module sensing a distance of an obstacle or a user.

16. The automatic vehicle-door activating sensing method according to claim 15, wherein the waveform of the activating information changing is defined as being close to and then being far away from, which are respectively determined, according to Doppler Effect, when a distance between the obstacle/the user and the activating sensing antenna module is decreased and increased.

\* \* \* \* \*